Nov. 29, 1955

P. E. YOUNG 2,724,895

NAVIGATING DEVICE

Filed June 2, 1953

INVENTOR
PHILIP E. YOUNG

BY
Eyre, Mann + Burrows
ATTORNEYS

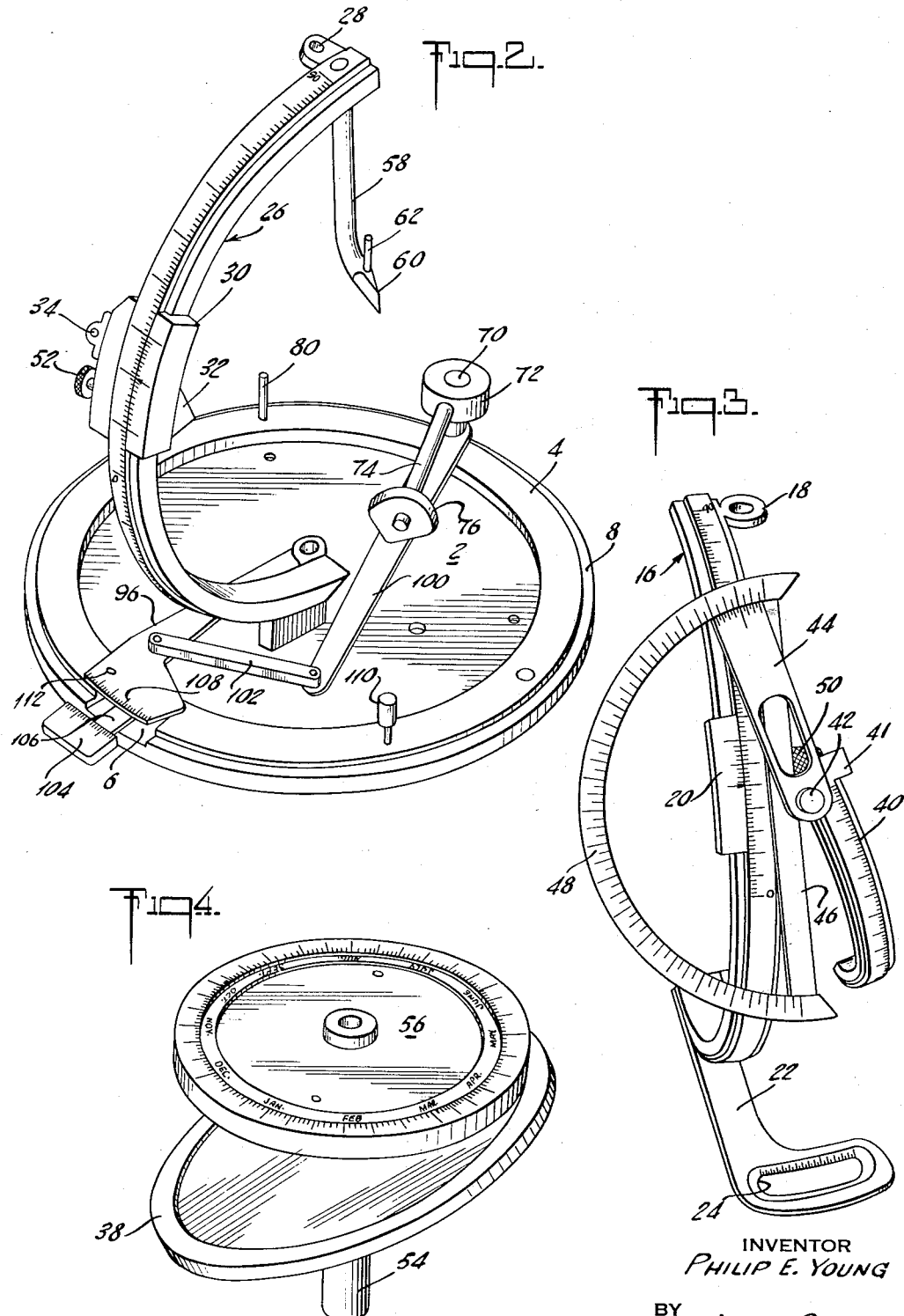

Nov. 29, 1955 P. E. YOUNG 2,724,895
NAVIGATING DEVICE
Filed June 2, 1953 5 Sheets-Sheet 3
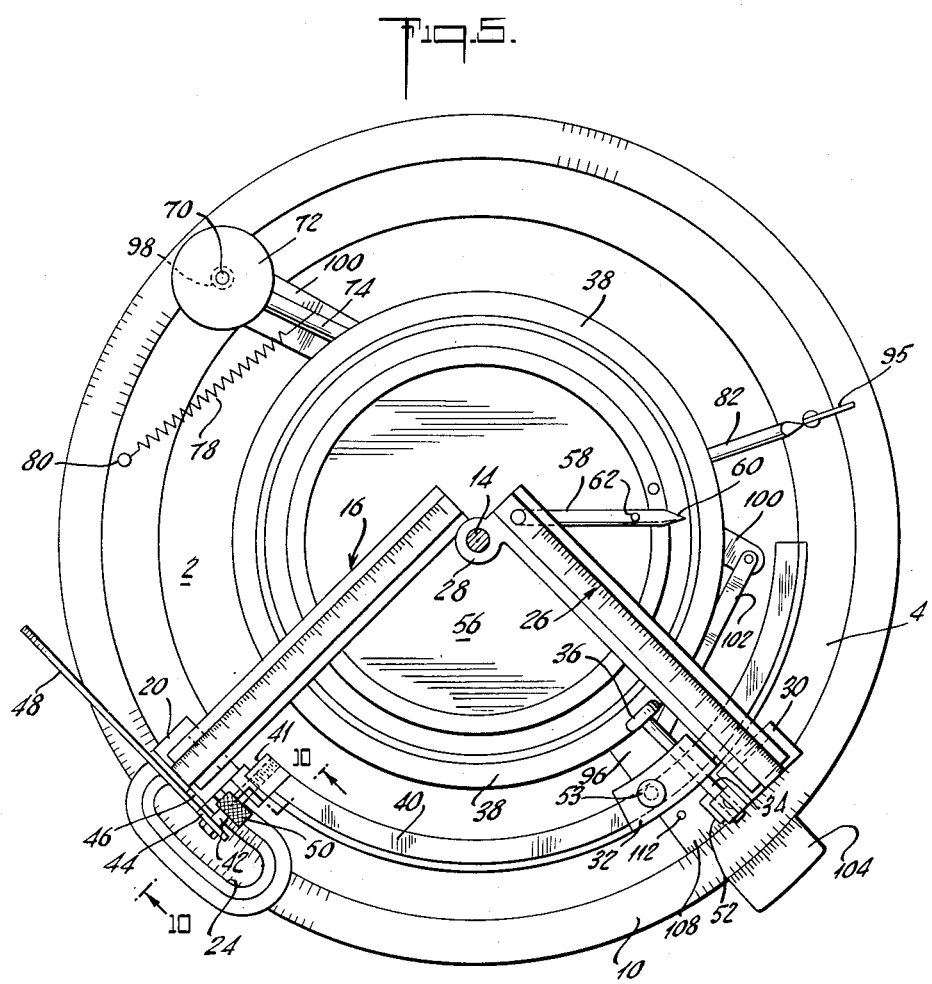
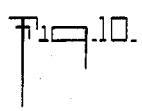
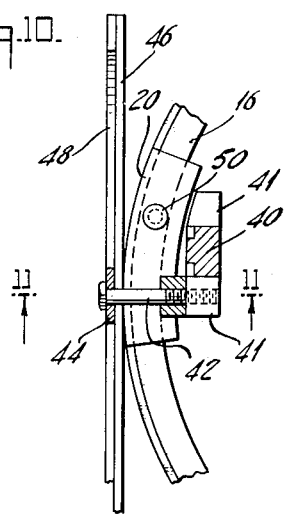
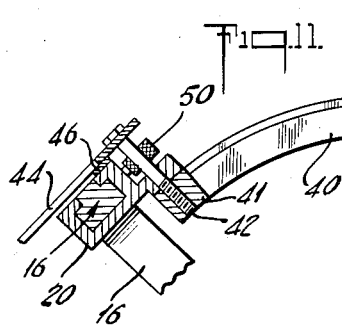
INVENTOR
PHILIP E. YOUNG

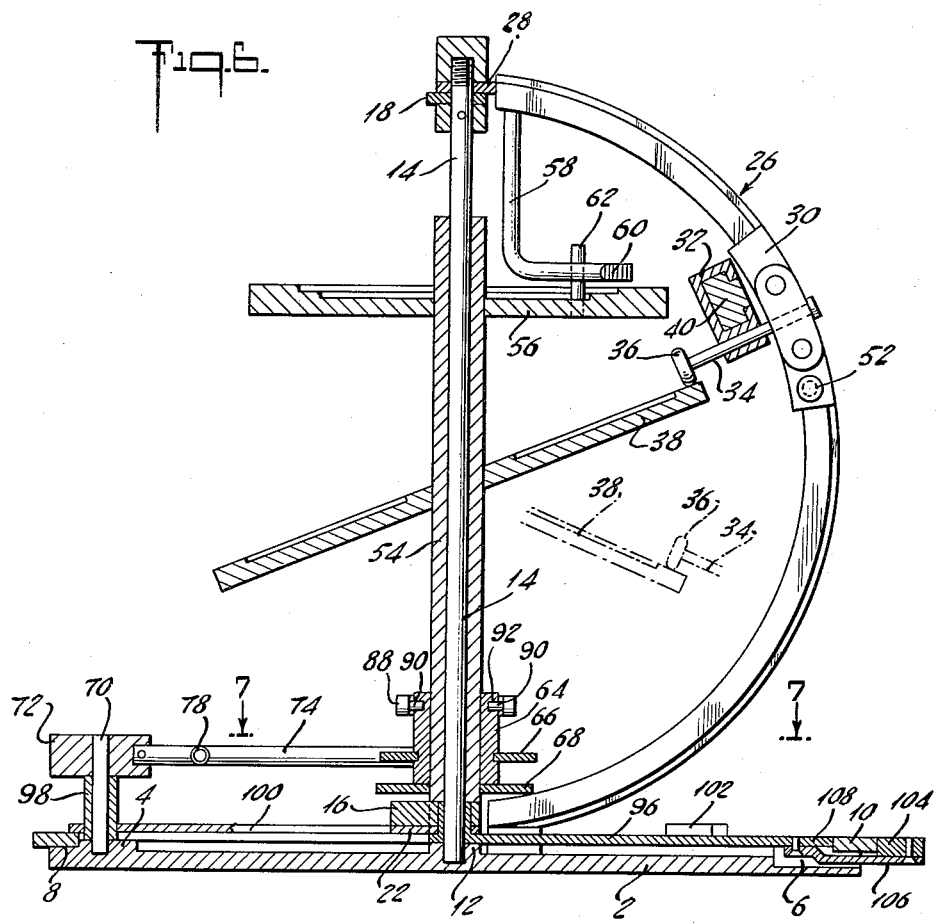
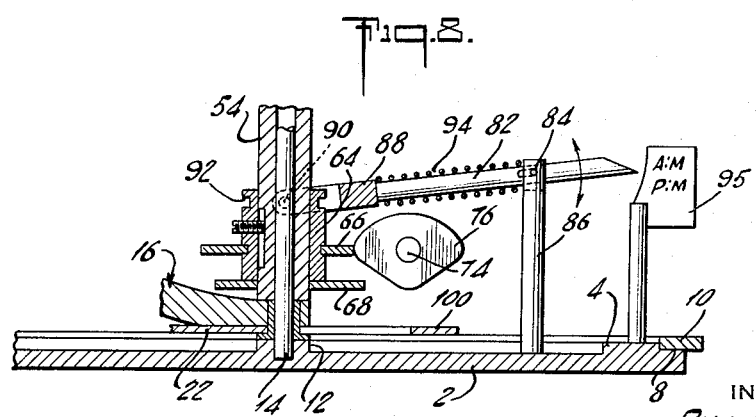

Nov. 29, 1955 P. E. YOUNG 2,724,895
NAVIGATING DEVICE
Filed June 2, 1953 5 Sheets-Sheet 5
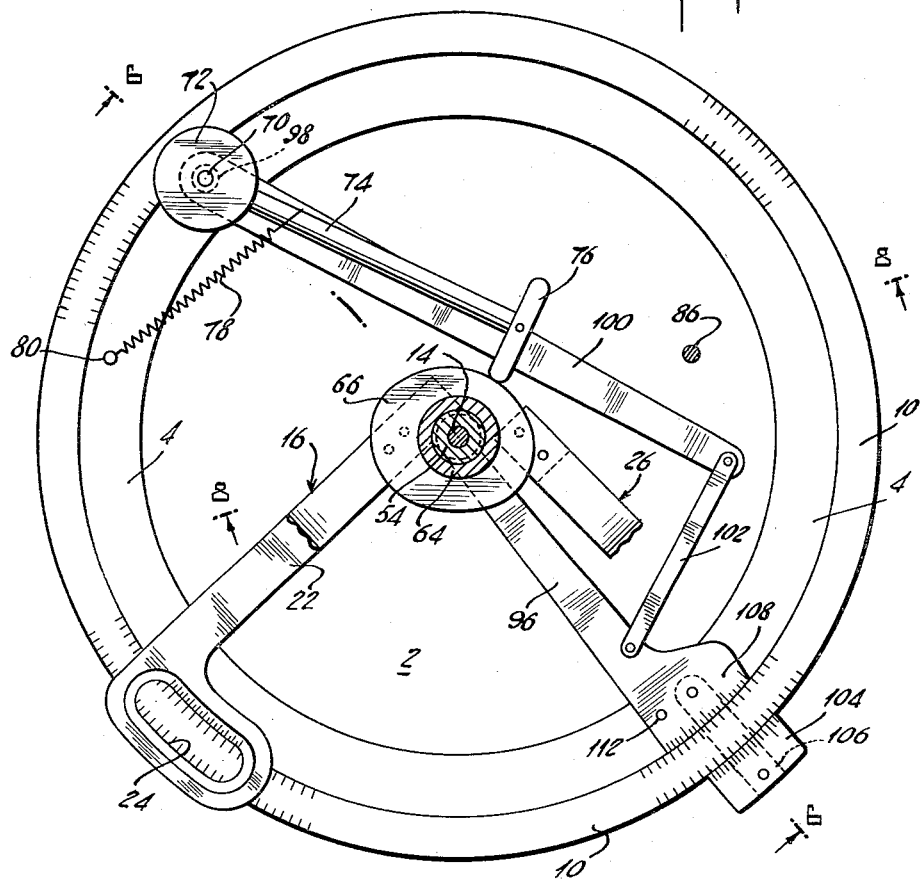
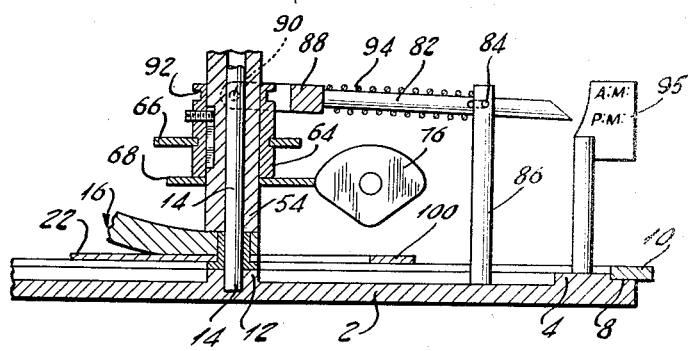
INVENTOR
PHILIP E. YOUNG
BY
Eyre, Mann & Burrows
ATTORNEYS United States Patent Office 2,724,895
Patented Nov. 29, 1955

2,724,895

NAVIGATING DEVICE

Philip E. Young, Fairhaven, Mass.

Application June 2, 1953, Serial No. 359,129

11 Claims. (Cl. 33—1)

The present invention relates to navigating instruments and comprises a novel device of this type which is simple in construction, accurate in use and automatically compensates for the equation of time on the hour angle, and also automatically selects the proper declination corresponding to the date, thus making it possible for a navigator having only the new instrument, a chronometer and a sextant to accurately locate himself anywhere. The information ordinarily obtainable only from astronomical tables is built into the new instrument, namely, the declination of the sun and the equation of time for each day of the year. The instrument yields the information necessary for plotting the Sumner line and can also be used for giving the local hour angle from a sight corresponding to a given latitude.

The instrument comprises essentially a fixed vertical semi-circular declination sector, a movable vertical semi-circular latitude sector rotatable about a vertical axis, a date disc and declination disc rigidly mounted for rotation together about the axis of rotation of the latitude sector, indicator slides on the declination and latitude sectors with which cooperate an altitude sector, an azimuth indicator and a rotatable time ring calibrated in degrees and in minutes of time and cooperating with verniers of which one is attached to the latitude sector and the other under the declination sector, is cam operated for correction for the equation of time.

For a better understanding of the invention and of a specific embodiment thereof, reference may be had to the accompanying drawings of which:

Fig. 2 is an isometric view of the declination sector, declination indicator, and one of the verniers associated with the time ring and the operating mechanism therefor;

Fig. 3 is an isometric view of the latitude sector and parts associated therewith;

Fig. 4 is an isometric view of the date disc and declination disc;

Fig. 5 is a top plan view of the instrument;

Fig. 6 is a vertical sectional view through the instrument taken on the line 6—6 of Fig. 7;

Fig. 7 is a horizontal sectional view through the instrument taken on the line 7—7 of Fig. 6;

Fig. 8 is a fragmentary vertical sectional view taken on the line 8—8 of Fig. 7 showing the position of the cams when a morning sight is taken;

Fig. 9 is a view similar to Fig. 8 but showing the position of the cams when an afternoon sight is taken;

Fig. 10 is a detailed vertical sectional view taken on the line 10—10 of Fig. 5 showing the connections between the latitude indicator and the altitude sector; and Fig. 11 is a sectional view taken on the line 11—11 of Fig. 10.

Figure 1:
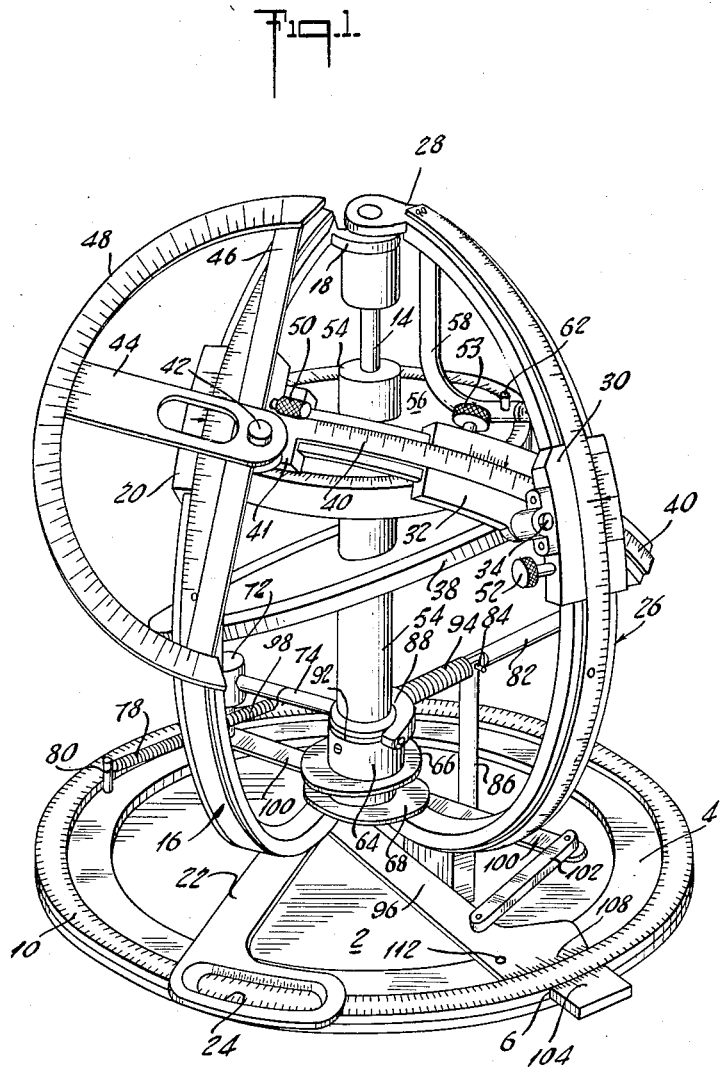
Fig. 1 is an isometric view of the new instrument.

The instrument illustrated in the drawings comprises a circular base 2 around the periphery of which is formed a flat annulus 4 which is interrupted over a short arc to provide an opening 6 shown best in Figs. 2 and 6. The outer periphery of the annulus 4 is spaced from the periphery of the base 2 to provide an annular shoulder 8 upon which is mounted a movable ring 10, the inner periphery of which is graduated in five-minute intervals for 24 hours which may be read to 15 seconds by means of the vernier and the outer periphery of which is graduated in degrees for 360°. At the center of the base 2 is a vertical shaft 14 about which rotate the various parts hereinafter to be described. A latitude sector 16 is mounted at its ends on the shaft 14 by means of ears offset from the edge of the sector, the upper ear 18 being visible in Figs. 1 and 3. The sector 16 has an engraved scale along the edge of the sector opposite to that from which the support ears are offset. The scale starts at the midpoint of the sector at 0° and terminates at the upper end of the sector at 90° at the level of the center of ear 18. The sector is channeled to accommodate an indicator slide 20 which carries a vernier for cooperation with the scale on the sector. Fixed to the lower end of the latitude sector 16 is a radially extending arm 22 having an opening 24 in its outer end which overlies the movable ring 10. Verniers on the inner and outer edges of the opening 24 cooperate with the inner and outer scales on the ring 10.

Fixed to the base 2 is a declination sector 26, the upper end of which receives the shaft 14 through an ear 28 offset from the edge of the sector. The declination sector is provided with a scale along one edge, of which the 0° indication is at the midpoint, a 90° indication at the top and a 90° indication at the bottom of the sector. A declination indicator slide 30 is mounted on the declination sector. The altitude vernier slide 32 is pivotally mounted on the declination indicator 30 by means of a pin 34 which passes through an ear on the declination indicator and through an aperture in the altitude indicator and terminates in a roller 36 which rests upon the declination disc 38 hereinafter to be described. The pin 34 (see Fig. 1) on the declination indicator slide 30 is spaced from the engraved edge of the declination sector a distance exactly equal to the horizontal distance between the axis of shaft 14 and the vertical plane containing the engraved edge of the sector. An altitude sector 40 is slidable in the indicator 32 and is graduated along its upper edge in degrees from 0° to 70°, the 70° indication being at the left-hand end of the sector as viewed in Fig. 1. At this left-hand end of the altitude sector there is formed an ear 41 and this ear carries a stud 42 which extends through the latitude indicator slide 20 and is fastened to an arm 44 which serves as an azimuth indicator, the arm 44 rotating with the stud 42 when the altitude sector pivots about the latitude indicator. Riveted or otherwise fixedly secured to the latitude indicator slide 20 is a strip 46 which supports at its ends the azimuth scale 48 with which the azimuth indicator 44 cooperates and serves as a vernier therefor. The stud 42 is exactly the same distance below the engraved edge of the altitude sector as is the pin 34. Thus the pivotal axes of the altitude sector on the latitude indicator slide and of the altitude indicator on the declination indicator slide are equi-distant from the calibrated edge of the altitude sector.

The latitude indicator slide 20 and the declination indicator slide 30 can be locked in position on their respective sectors by means of thumb screws 50 and 52 respectively and the altitude sector can be locked on the altitude indicator by means of a thumb screw 53.

The declination disc 38 is fixedly mounted on a sleeve 54 so as to be rotatable about the shaft 14, the disc being secured to the sleeve at an angle to the horizontal. Above the declination disc 38 and also secured to the sleeve 54, is a date disc 56 which is horizontally disposed and carries adjacent its periphery a scale with 365 graduations thereon corresponding to the days of the year and with the months of the year designated thereon. A date indicator arm 58 having an indicator point 60 at one end is secured at its other end to the upper end of the declination sector 26. The arm 58 extends downwardly from its point of support to a level just above the date disc 56 and then turns radially outward to bring the indicator point 60 over the scale on the date disc. A thumb screw 62 passes through a threaded hole in the indicator arm 58 to lock the date disc and declination disc in any adjusted position. The rotation of the date disc 56 to bring any specific date under the point 60 of the date indicator correspondingly rotates the declination disc 38 and thereby, through the intermediary of the roller 36, causes the declination indicator 30 on the declination sector 26 to move to the proper declination for that date.

A short sleeve 64 is slidably keyed to the sleeve 54 adjacent the lower end thereof so as to be movable longitudinally on the sleeve 54 and rotatable therewith. Two cams 66 and 68 are fixed to the sleeve 64 and these cams serve to correct for local angle hour, for morning and afternoon sights respectively, through the intermediary of the parts now to be described. (See Fig. 2.) A stud 70 is mounted on the annulus 4 of the base 2 and rotatably mounted on this stud 70 is a drum 72 to which is attached one end of an arm 74 carrying at its other end a cam follower 76. The cam follower 76 is urged into engagement with one or the other of the cams 66 and 68 by a tension spring 78, one end of which is secured to the arm 74 and the other end of which is secured to a pin 80 mounted in the annulus 4. The particular one of the cams 66 and 68 with which the cam follower 76 engages depends upon the vertical position of the sleeve 64. When the sleeve is in the lowermost position, that illustrated in Figs. 6 and 8, the follower 76 engages the upper cam 66 and this corresponds to a morning sight. When the sleeve 64 is raised, the follower 76 engages the lower cam 68 and this corresponds to an afternoon sight. The means for optionally raising and lowering the sleeve 64 comprises a lever arm 82 which is pivotally mounted intermediate its ends on a horizontally disposed pivot pin 84 carried in the upper bifurcated end of a vertical post 86; the arm 82 being longitudinally slotted for reception of the pivot pin and to permit slight longitudinal play at the pivotal axis. A yoke 88 is secured to one end of the lever arm 82 and pins 90 carried by the yoke ride in an annular groove 92 in the sleeve 64. A compression spring 94 encircles the arm 82 between the yoke and pivot pin to maintain the pins 90 in the groove 92 in any position of the lever arm. Adjacent the free end of the arm 82 is an indicator 95 marked with the letters AM and PM corresponding to the desired position of the sleeve 64 for morning and afternoon sights.

The slight movement of the cam follower 76 toward or away from the shaft 14 when the date disc is rotated is transmitted to an arm 96 which is rotatably mounted at one end on the shaft 14. The coupling between arm 96 and the follower 76 comprises a sleeve 98 on the stud 70 which is fixed to the drum 72 so as to rotate therewith and a lever 100 which is fixed at one end to the sleeve 98 and coupled at its other end by means of a link 102 to the arm 96. A vernier 104 for cooperation with the outer scale on ring 10 is mounted on a strip 106 which extends through the opening 6 in the annulus 4 and is riveted to the underside of the end of arm 96. A vernier 108 on the end of arm 96 cooperates with the inner scale on ring 10. The opening 6 permits limited angular movement of the arm 96 and the spacing of the verniers 104 and 108 is such as to accommodate the ring 10 therebetween as shown best in Fig. 6.

The cams 66 and 68 are so cut as to provide the proper correction for the equation of time corresponding to the date. These cams may be readily formed empirically as the specific shape thereof will depend upon the location of the stud 70 and the coupling between the arm 96 and the cam follower 76. In forming the cams, the vernier 108 can be set at successive dates at the proper equation of time corresponding to such dates and at each such position the desired dimension of the cams may be determined.

The operation of the above described mechanism for obtaining the information necessary for plotting the Sumner line is as follows:

After having taken the altitude of the sun and assuming a latitude from dead reckoning, the latitude indicator 20 is moved on latitude sector 16 until the vernier on the indicator indicates the assumed latitude. The date disc 56 is then rotated to bring the date under the indicator point 60 of the date indicator and the locking thumb screw 62 is then set to hold the date disc and parts associated therewith in fixed position. The rotation of the date disc 56 moves the declination indicator 30 to its correct position corresponding to the declination at that date. The latitude sector 16 is then moved toward or away from the declination sector 26 until the altitude of the sun which has been taken is properly indicated by the vernier on indicator 32 and, assuming this is a morning sight and the indicator arm 82 is in the position shown in Fig. 8, the ring 10 is then rotated until the vernier on the inner edge of the opening 24 indicates Greenwich time. The longitude corresponding to the assumed latitude can then be read from vernier 104 in cooperation with the scale on the outer periphery of the ring 10. Leaving everything set, the latitude indicator is then moved on the latitude sector to another assumed latitude and the ring 10 moved until the vernier on the inner edge of the opening 24 again read Greenwich time. The longitude corresponding to the newly assumed latitude is then read on the vernier 104, thus giving the information necessary for plotting of the Sumner line. If an afternoon sight is being taken, the free end of the arm 82 is depressed to raise the sleeve 64 and bring the follower 76 into engagement with the cam disc 68. The same procedure is followed as in the morning sight except that the ring 10 is moved so that the vernier 108 in cooperation with the inner scale on ring 10 reads the Greenwich time and the longitude corresponding to the assumed latitude and to the determined altitude, is read on the vernier on the outer edge of the slot 24. The two cams, one for morning and one for afternoon sights are necessary because correction for the equation of time is made on the local hour angle and not on the Greenwich hour angle. In the morning the proper longitude is obtained by adding the local hour angle to the Greenwich hour angle and therefore the upper cam is used and the Greenwich time is set to the vernier on the inner edge of the slot 24. In the afternoon sight, as the local hour angle is subtracted from the Greenwich hour angle (not added as in a morning sight) if the equation of time is a minus figure, a positive or plus correction for the equation of time must be added to the local hour angle; and if the equation of time is plus, a minus correction must be added to the local hour angle in order to make the vernier 24 read the proper longitude.

The above described instrument may also be used to determine local hour angle from a sight corresponding to a given latitude. For this purpose the date disc 56 is so rotated that the arm 96 is as far as possible to the left as viewed in Fig. 1. A pin 110 is then inserted through a hole 112 in arm 96 and into a corresponding hole in the ring 4 to lock the verniers 104 and 108 in this position. This sets the arm 96 directly under the declination sector 26 and arm 96 is in proper position for zero equation of time. The declination indicator 30 is then moved upwardly on the declination sector and set at the proper declination and locked there by means of the thumb screw 52. Latitude indicator 20 is then set at the proper latitude and the latitude sector is moved until the proper altitude is indicated by the vernier on indicator 32.

Time ring 10 is then rotated to bring 12 o'clock opposite the vernier on the inner edge of slot 24. Vernier 104 then yields the local hour angle.

In each of the foregoing operations, the azimuth may be read directly on the sector 48 by means of the vernier on the indicator arm 44.

The invention has now been described with reference to one specific embodiment thereof. Obviously, various changes in details thereof could be made and parts could be omitted without departing from the spirit of the invention or the scope of the accompanying claims. It will be apparent that the invention provides a rugged yet precise instrument which yields the information necessary for navigation and yet does not require the use by the navigator of tables or require that any computations be made. As heretofore indicated, a navigator equipped with the new intrument and with a chronometer and with a sextant, will have all essential apparatus for his purpose.

This instrument is designed and constructed for use with solar observations only, but it can be used to advantage in the calculation of the local hour angle of any star or planet; in which case, of course, the declination (and in the case of planets, the Greenwich civil time of transit meridian of Greenwich) must be taken from the Nautical Almanac. This method of determining the local hour angle has already been described.

The following is claimed:

1. A navigation instrument comprising in combination a fixed declination sector having an indicator slide thereon, a latitude sector rotatable about an axis parallel to the diametral chord of the declination sector and having an indicator slide thereon, an altitude indicator pivotally mounted on said declination indicator slide, an altitude sector pivotally mounted at one end on said latitude indicator slide and slidable in said altitude indicator, an indicator arm fixed to said latitude sector and radially disposed with respect to the axis of rotation thereof, a second indicator arm radially disposed with respect to the axis of rotation of the latitude sector and rotatable thereabout through a limited arc, a manually rotatable ring having scales graduated from zero to 360° on its outer periphery and in Greenwich time on the inner periphery so that zero Greenwich time is radially inwards from 180° on the outer periphery, said scales being readable in conjunction with said indicator arms and cam means for setting the angular position of said last mentioned indicator arm in accordance with the date to correct for the equation of time.

2. The instrument according to claim 1 wherein said last mentioned means comprise a shaft, a sleeve rotatably mounted thereon, a date disc fixed to said sleeve and carrying graduations representing the days of the year, a pair of cams rotatable with said sleeve and a cam follower optionally engageable with one or the other of said cams and operatively coupled to said second indicator arm, one of said cams serving to correct the position of said second arm for a morning sight and the other serving to correct for an afternoon sight.

3. The instrument according to claim 2 including a declination disc fixed to said sleeve and angularly disposed with respect both to the axis of said shaft and to the plane of said date disc, and means coupling said declination disc to said declination indicator slide to correlate the position of the declination indicator slide on the declination sector with the position of the declination disc corresponding to a given day of the year.

4. The instrument according to claim 3 wherein said altitude indicator is mounted on said declination indicator slide by means of a stud which is mounted in said declination indicator slide, passes through said altitude indicator and carries at its end a roller adapted to rest upon and ride on the declination disc, said stud and roller comprising said means coupling the declination disc and declination indicator.

5. The instrument according to claim 4 wherein said declination sector has a scale along one edge thereof and the axis of said stud is spaced from said edge through a distance equal to that between the axis of rotation of the latitude sector and the vertical plane containing said edge of said declination sector.

6. The instrument according to claim 1 including an azimuth arc mounted on said latitude indicator slide with its center of curvature disposed at the pivotal axis of the altitude sector on the latitude indicator slide, and an azimuth indicator arm radially disposed with respect thereto and fixed to the altitude sector for pivotal movement therewith about the center of curvature of said azimuth arc.

7. The instrument according to claim 1 wherein each of said radially disposed indicator arms carries two verniers for cooperation with the scales on said ring.

8. The instrument according to claim 1 wherein said altitude sector has a scale along one edge calibrated in degrees and wherein the pivotal axes of said altitude sector on the latitude indicator slide and of said altitude indicator on said declination indicator slide are equidistant from said edge of the altitude sector.

9. The instrument according to claim 1 including means for locking said indicator slides on their respective sectors.

10. A navigation instrument comprising in combination a circular base, a ring rotatably mounted adjacent the periphery of said base and carrying scale graduations along its inner and outer peripheries, a vertical shaft supported by said base at the center thereof, a latitude sector rotatably mounted adjacent its ends on said shaft and having a scale thereon graduated in degrees from 0° at the center to 90° at the upper end, an indicator arm fixed to said latitude sector and carrying verniers for cooperation with the scales on said ring, a declination sector fixedly mounted on said base with its ends adjacent said shaft, said declination sector having a scale thereon graduated in degrees from 0° at the center to 90° at the upper end and to 90° at the lower end, indicator slides carrying verniers mounted on said latitude and declination sectors, an altitude indicator pivotally mounted on said declination indicator slide, an altitude sector slidable in said altitude indicator and pivotally mounted at one end on said latitude indicator slide, said altitude sector being graduated in degrees along one edge and the pivotal axes of said altitude indicator and of said altitude sector being equidistant from said graduated edge of the altitude sector, a sleeve rotatably mounted on said shaft and fixedly supporting a horizontal disc and a disc disposed at an angle to the horizontal, said horizontal disc having indicia and graduations adjacent its periphery identifying the days of the year, a fixed indicator for cooperation with the graduations on said horizontal disc, means coupling said declination indicator slide with said inclined disc to change the setting of the declination indicator when said sleeve is rotated to bring a different date on said horizontal disc into position for cooperation with said fixed indicator, a second indicator arm rotatably mounted at one end on said shaft and cam means rotatable with said sleeve and linked to said second indicator arm for setting the angular position thereof in accordance with the date for correction of the equation of time, said last mentioned indicator arm carrying verniers for cooperation with the scales on said ring.

11. A navigation instrument comprising in combination, a fixed indicator, manually movable means carrying graduations indicative of the days of a year adapted to be individually brought into register with said indicator, a declination sector having a scale thereon, a declination indicator slide on said sector, means coupling said movable means with said declination indicator slide for automatically setting the declination indicator on the declination sector at the point on its scale corresponding to the declination of the sun for the day registered by said fixed indicator, a latitude sector having a scale thereon and carrying a latitude indicator slide, said latitude sector being manually movable toward and away from said declination sector, an altitude sector and indicator therefor supported by said latitude and declination indicator slides for determining the desired position of the latitude sector in accordance with the positions of the latitude and declination indicator slides and an altitude determination, a manually rotatable time ring provided with time and hour angle scales and a pair of movable indicator arms each carrying verniers for cooperation with the scales on said ring, one of said arms being moved by said latitude sector and the other of said arms being coupled to said first mentioned means whereby local hour angle and longitude can be determined from the scales on said time ring by reference to the positions of said indicator arms.

References Cited in the file of this patent

UNITED STATES PATENTS

| | | |
|---|---|---|
| 943,532 | French et al. | Dec. 14, 1909 |
| 2,403,920 | Hagner | July 16, 1946 |
| 2,466,225 | Gee | Apr. 5, 1949 |
| 2,519,532 | Zerbee | Aug. 22, 1950 |